(12) United States Patent
Shim et al.

(10) Patent No.: US 7,609,434 B2
(45) Date of Patent: Oct. 27, 2009

(54) METHOD FOR MANUFACTURING ELECTRODE FOR ELECTROCHROMIC DISPLAY

(75) Inventors: Hong Shik Shim, Seoul (KR); In Seo Kee, Gyeonggi-Do (KR); Ick Hwan Ko, Seoul (KR); Young Gu Lee, Gyeonggi-Do (KR)

(73) Assignee: Samsung Electronics Co., Ltd. (KR)

( * ) Notice: Subject to any disclaimer, the term of this patent is extended or adjusted under 35 U.S.C. 154(b) by 16 days.

(21) Appl. No.: 11/873,608

(22) Filed: Oct. 17, 2007

(65) Prior Publication Data

US 2008/0316573 A1   Dec. 25, 2008

(30) Foreign Application Priority Data

Jun. 20, 2007   (KR)   ........................ 10-2007-0060563

(51) Int. Cl.
*G02F 1/155* (2006.01)
*C09K 19/02* (2006.01)
*G09G 3/38* (2006.01)

(52) U.S. Cl. ........................ 359/266; 349/182; 345/105

(58) Field of Classification Search ......... 359/265–270, 359/272–275, 277, 245–247, 254; 345/49, 345/105; 349/182–186; 348/814; 250/70; 438/929
See application file for complete search history.

(56) References Cited

U.S. PATENT DOCUMENTS

| | | | |
|---|---|---|---|
| 5,216,536 A * | 6/1993 | Agrawal et al. | 359/274 |
| 6,067,184 A | 5/2000 | Bonhote | |
| 6,426,827 B1 | 7/2002 | Bonhote | |
| 6,446,402 B1 * | 9/2002 | Byker et al. | 52/173.3 |
| 2007/0188841 A1 * | 8/2007 | Moeller et al. | 359/265 |

* cited by examiner

*Primary Examiner*—Scott J Sugarman
*Assistant Examiner*—Dawayne A Pinkney
(74) *Attorney, Agent, or Firm*—Cantor Colburn LLP

(57) ABSTRACT

Disclosed is a method for manufacturing an electrode of an electrochromic display. The method includes, prior to forming a porous nanoelectrode, forming a barrier rib for separating an electrolyte using a photosensitive paste as a material for the barrier rib, in which the photosensitive paste enables formation of patterns through a photolithographic process and maintains its shape at 450° C. to 500° C. The use of the electrode enables fabrication of an electrochromic display that is capable of preventing cross-talk between pixels and has advantages of fast response speed, prolonged lifespan upon repeated use and improved electrochromism, when compared to the case of metal oxide electrodes.

15 Claims, 5 Drawing Sheets

METHOD FOR MANUFACTURING ELECTRODE FOR ELECTROCHROMIC DISPLAY

This non-provisional application claims priority under 35 U.S.C. § 119 to Korean Patent Application No. 10-2007-0060563, filed on Jun. 20, 2007 in the Korean Intellectual Property Office (KIPO), the entire contents of which are herein incorporated by reference.

BACKGROUND OF THE INVENTION

1. Field of the Invention

Example embodiments relate to a method for manufacturing an electrode for an electrochromic display. Other example embodiments relate to a method for manufacturing an electrode for an electrochromic display that is capable of preventing interference (i.e. cross-talk) between adjacent pixels by which a barrier rib for separating an electrolyte is formed prior to a porous nanoelectrode.

2. Description of the Related Art

Electrochromic displays include two electrodes which face each other, and an electrochromic layer which consists of an electrochromic material and an electrolyte and is interposed between the two electrodes. Electrochromic displays are displays that use the phenomenon in which an electrochromic material shows change in color according to a potential difference applied across the two electrodes. Such electrochromic displays use the principle that when an external electrical stimulus is applied to a transparent electrode and a counter electrode between which an electrolyte is filled to create a potential difference between the electrodes, ions and electrons contained in the electrolyte migrate into an electrochromic layer to participate in a redox (oxidation/reduction) reaction, thus causing visual changes in color or shade. Electrochromic displays are currently used in information processing, including recording, display and output of information, because of their ability to control optical properties.

Conventional electrochromic displays have disadvantages of slow response speed, short lifespan, and occurrence of cross-talk between adjacent pixels caused by ion migration. Recently, an electrochromic display having a novel structure has been developed in which an electrochromic material is coated on the surface of a porous electrode composed of fine powders (U.S. Pat. Nos. 6,067,184 and 6,426,827). As a result, it is possible to realize a commercially available electrochromic display with a high response speed and long lifespan.

The ions contained in the electrolyte used for electrochromic displays are in an oxidized- or reduced-state and migrate into the space between two electrodes facing each other and thus undergo change in their state, to render electric charges to migrate into the space between the electrodes. Accordingly, the migration speed and direction of such ions greatly affect the performance of electrochromic displays. Most particularly, in a case that is designed to control the electrochromic property of a specific pixel, which is composed of the two electrodes in parallel, ions unexpectedly migrate through an electrolyte solution into the electrodes of adjacent pixels rather than those of the specific pixel, undesirably causing variation in the electrochromic property of the adjacent pixels. In an attempt to solve this problem, several techniques to control ion migration have been suggested. The most efficient method is to form a barrier rib at each pixel, which prevents ions from migrating into adjacent pixels.

A material for the barrier rib to accomplish this purpose must be physically durable and be not chemically reacted with an electrolyte solution. To realize high-resolution displays, the barrier rib having a width equivalent to the gap between adjacent pixels, needs to be formed at each pixel. For mass-production, it is preferable to use a material that is suitable for application to photolithography. Most of conventional techniques that satisfy these requirements use photoresist as the barrier rib material. In prior arts, metal oxide such as $WO_3$ was generally used as a material for an electrode (electrochromic layer) of electrochromic displays. In this case, since the surface of the electrode is even and dense, there is no great problem in producing a barrier rib with the use of photoresist.

FIG. 1 is a process flowchart illustrating a method for manufacturing an electrode for an electrochromic display according to one conventional method. In this method, the electrode for an electrochromic display is produced by forming a wiring electrode on a substrate, forming a metal oxide electrode (electrochromic material) on the substrate and forming a barrier rib on the metal oxide electrode with the use of photoresist. However, the metal oxide electrode has several disadvantages of slow electrochromic reaction speed, high consumption powder and short lifespan, thus making it nearly impossible to realize substantially commercially available display devices.

Unlike to the metal oxide electrode, the porous fine-particle electrode recently developed has advantages of large surface area, superior electrochromism due to high-density electrochromic material, fast response speed, and long lifespan during repeated use, thus being of potential practical applications for display devices. FIG. 2 is a process flowchart illustrating a method for manufacturing an electrode for an electrochromic display using a porous nanoelectrode composed of fine particles. Referring to FIG. 2, there are two methods to produce an electrode for an electrochromic display using the porous nanoelectrode. Specifically, one is forming a barrier rib with photoresist following forming an electrode and the other is forming an electrode following forming a barrier rib with photoresist. In the former method, photoresist permeated into the porous nanoelectrode during coating makes it impossible to form normal patterns in light-exposure and development processes. This problem is inevitable even with the use of any photosensitive material, instead of photoresist.

On the other hand, in the latter method, there occurs no structural problem in the former method. However, this method is impossible to practically use, because there is no photoresist capable of exhibiting heat resistance at 450° C. to 500° C., which is a sintering temperature of the porous nanoelectrode.

SUMMARY OF THE INVENTION

Example embodiments provide a method for manufacturing an electrode of an electrochromic display, the method comprising, prior to forming a porous nanoelectrode, forming a barrier rib for separating an electrolyte using a photosensitive paste as a material for the barrier rib in which the photosensitive paste enables formation of patterns through a photolithographic process and maintains its shape at 450° C. to 500° C.

Example embodiments provide an electrochromic display that is capable of preventing cross-talk between pixels and that has advantages of fast response speed, prolonged lifespan upon repeated use and improved electrochromism.

In accordance with example embodiments, there is provided a method for manufacturing an electrode of an electrochromic display comprising:

forming a wiring electrode on a substrate;

forming a barrier rib on the wiring electrode with the use of a photosensitive paste;

injecting an electrode-forming paste containing nanoparticles into the barrier rib;

sintering the barrier rib and the electrode-forming paste to form a porous nanoelectrode; and coating an electrochromic material on the nanoparticle surfaces of the nanoelectrode.

BRIEF DESCRIPTION OF THE DRAWINGS

Example embodiments will be more clearly understood from the following detailed description taken in conjunction with the accompanying drawings.

FIG. 1 is a process flowchart illustrating a method for manufacturing an electrode for an electrochromic display according to one conventional method;

FIG. 2 is a process flowchart illustrating a method for manufacturing an electrode for an electrochromic display according to another conventional method;

FIG. 3 is a process flowchart illustrating a method for manufacturing an electrode for an electrochromic display according to example embodiments of the present invention;

FIG. 4 is cross-sectional views schematically illustrating the structure of an electrode for an electrochromic display manufactured at each step of the method in FIG. 3;

FIG. 5 is cross-sectional views illustrating the state of a porous nanoelectrode composed of semiconductor nanoparticles before and after sintering;

FIG. 6 is a schematic view illustrating the structure of an electrochromic display having a barrier rib for separating pixels; and FIG. 7 is a cross-sectional view schematically illustrating the structure of an electrochromic display according to example embodiments of the present invention.

DESCRIPTION OF THE PREFERRED EMBODIMENTS

The present invention will now be described in greater detail with reference to the accompanying drawings.

Figure 1:
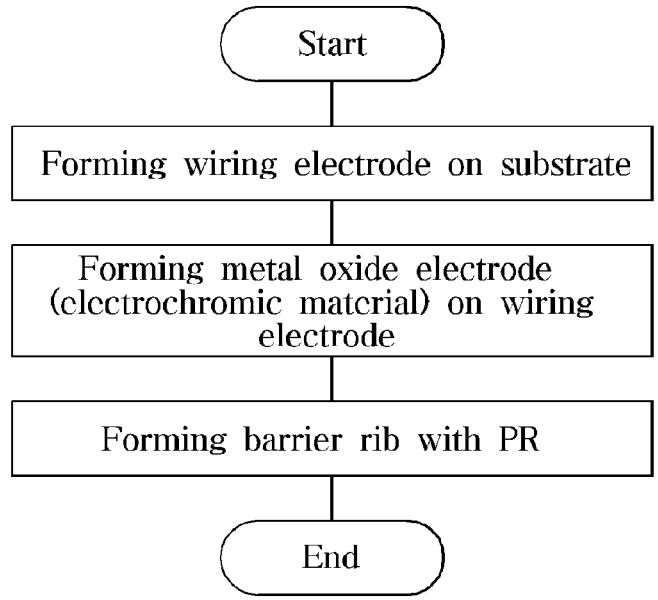
FIGS. 1-7 represent non-limiting, example embodiments as described herein.
Figure 2:
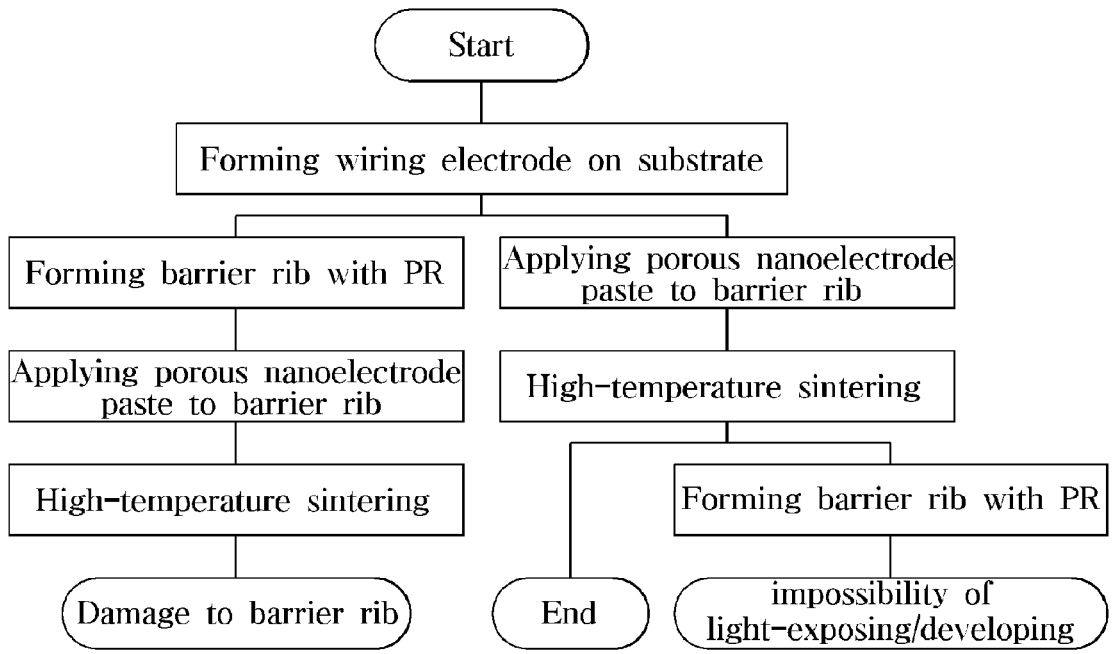
Figure 3:
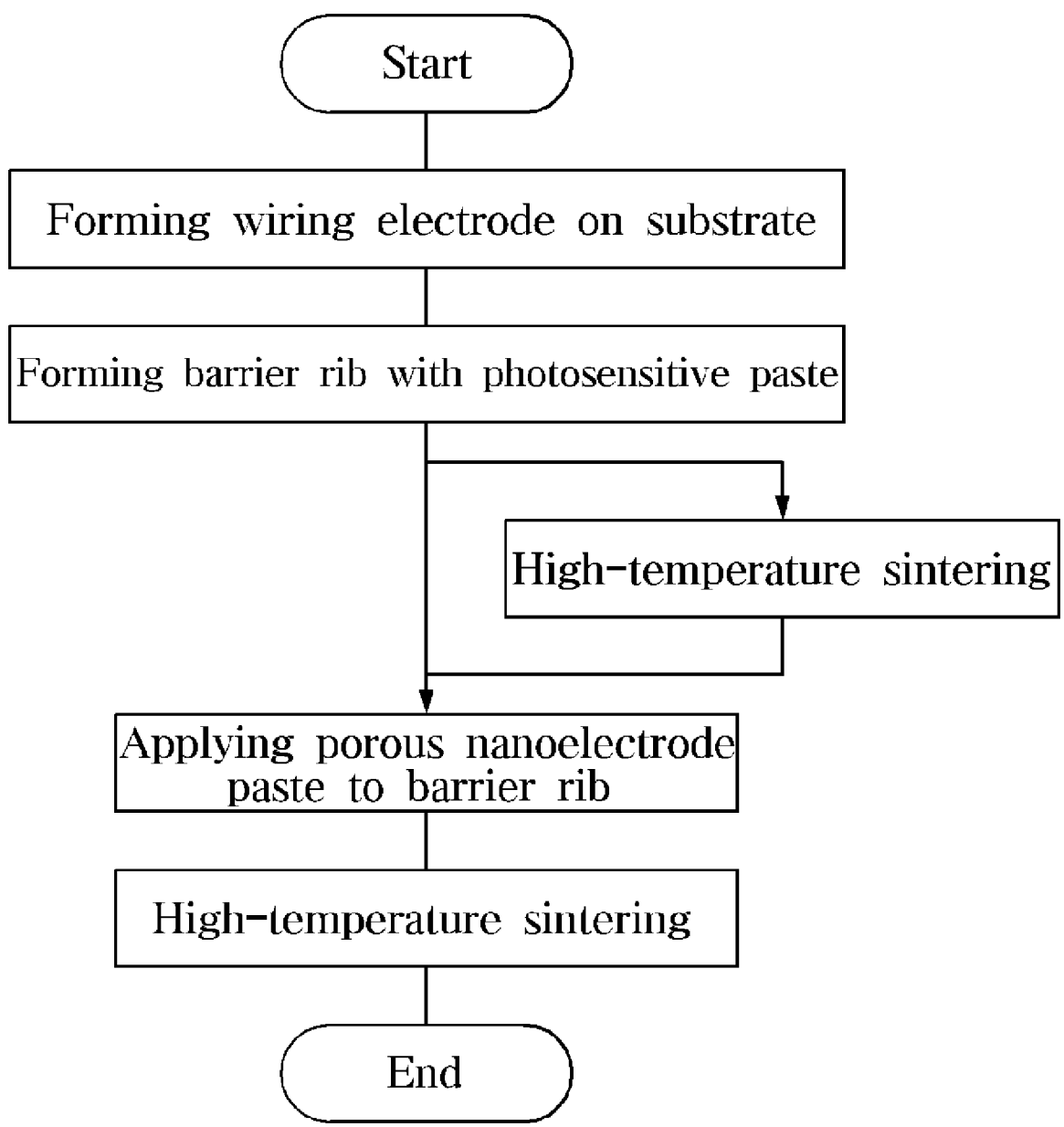
Figure 4:
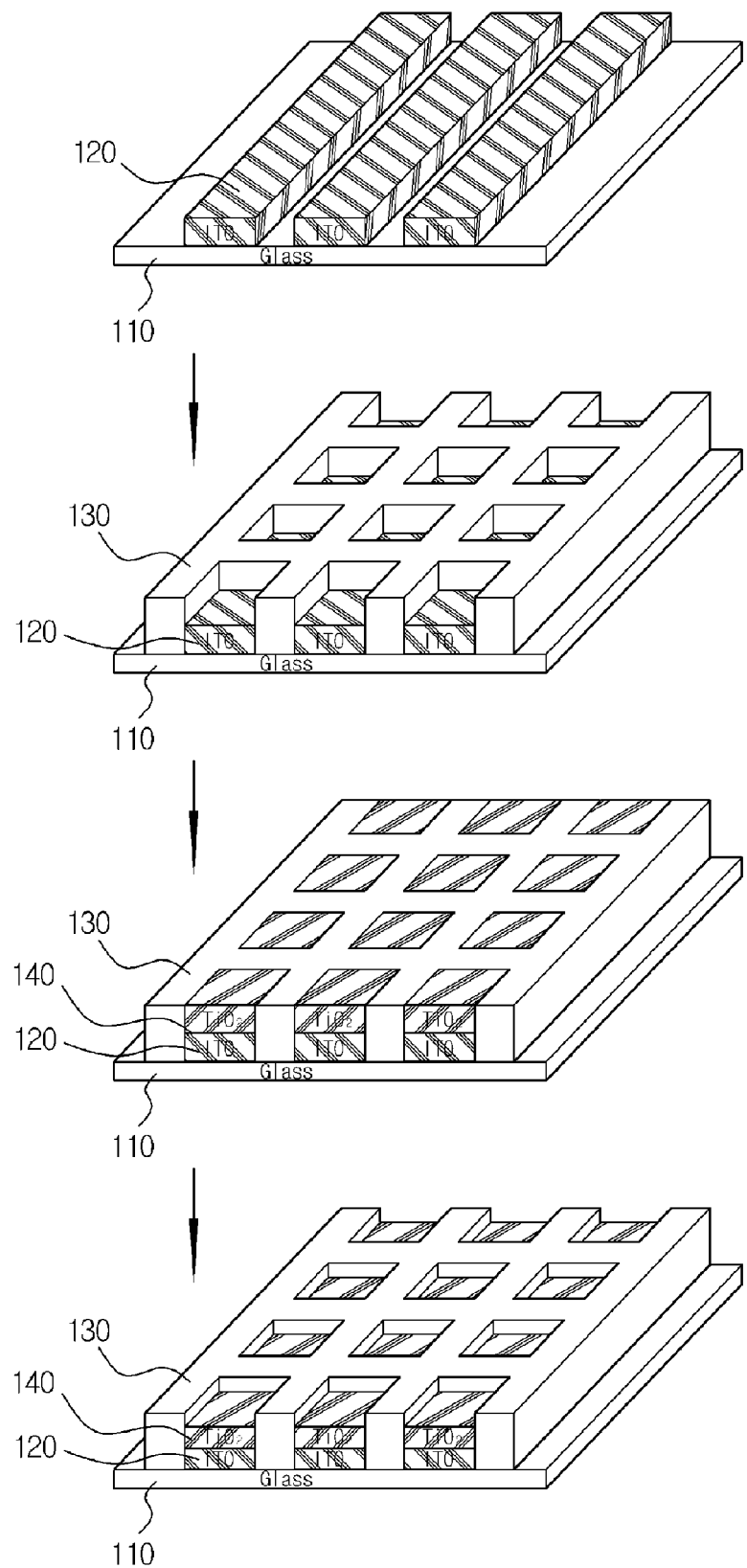

FIG. 3 is a process flowchart illustrating a method for manufacturing an electrode for an electrochromic display. FIG. 4 is cross-sectional views schematically illustrating the structure of an electrode for an electrochromic display obtained at each step of the method in FIG. 3.

The manufacture method according to example embodiments of the present invention will be described with reference to FIGS. 3 and 4. First, wiring electrodes 120 are formed on a substrate 110. A barrier rib 130 is formed on the wiring electrodes 120 through a photolithographic process using a photosensitive paste. An electrode-forming paste containing nanoparticles is applied into the spaces which are defined by the barrier rib 130. Then, the barrier rib 130 and the electrode paste are sintered at a high temperature to form a porous nanoelectrode 140. An electrochromic material is coated on the nanoparticle surfaces of the porous nanoelectrode 140.

According to other example embodiments of the present invention, the manufacture method may further comprise, after forming the barrier rib with the photosensitive paste, sintering the barrier rib 130 at a high temperature to remove an organic material inside the barrier rib 130.

The wiring electrode 120 in the electrode for an electrochromic display according to the present invention is formed by coating a conductive material on a substrate. Any substrate may be used without particular limitation so long as it is transparent. Examples of the substrate include transparent inorganic substrates, such as quartz and glass, and transparent plastic substrates, such as polyethylene terephthalate (PET), polyethylene naphthalate (PEN), polycarbonate, polystyrene and polypropylene. As conductive materials that can be coated on the substrate, there may be exemplified indium tin oxide (ITO), fluorine-doped tin oxide (FTO), $ZnO\text{—}Ga_2O_3$, $ZnO\text{—}Al_2O_3$, and $SnO_2\text{—}Sb_2O_3$.

The photosensitive paste used as a material for the barrier rib 130 in the present invention must satisfy the requirements of allowing patterns to be formed through a photolithographic process and retaining its shape at 450° C. to 500° C. The photosensitive paste is composed of an inorganic solid powder and a binder. The photosensitive paste is sintered at a constant temperature, equivalent to or slightly higher than the sintering temperature of the electrode material. Accordingly, the photosensitive paste is suitable for use as a barrier rib material of an electrochromic display of the present invention. The photosensitive paste must comprise: inorganic particles whose glass transition temperature (Tg) and thermal softening temperature (Tc) are higher than the sintering temperature of the porous nanoelectrode; and an organic ingredient containing a photosensitive compound. In addition, the sintered photosensitive paste must exhibit insulating property.

According to example embodiment of the present invention, the inorganic particles are composed of $SiO_2$ or $Al_2O_3$ and the organic ingredient includes: a mixture of methyl acrylate and isobutyl acrylate as a photosensitive monomer; a mixture of methyl acrylate and isobutyl acrylate as a photosensitive polymer; a benzophenol-based compound as a photopolymerization initiator and ultraviolet absorber; 2,4,6-trimethylphenol as an additive including a photopolymerization inhibitor and plasticizer.

The characteristics of the barrier rib vary depending upon the composition ratio of the organic ingredient, in which inorganic particles and photosensitive compound are contained. In particular, to realize the electrochromic display of the present invention, superior durability and photosensitivity are inevitably required for the barrier rib. The durability of the barrier rib affects prevention of permeation of an electrolyte solution and ions therein, and is improved, in proportion to an increase in the ratio of the inorganic particles contained in the photosensitive paste. The photosensitivity is associated with a maximum density of the barrier rib that can be realized during development following light-exposure, and determines a minimum size of each pixel that can be realized in a display, so-called, a maximum resolution that can be realized in a display. The photosensitivity is improved, according to an increase in the ratio of the organic photosensitive material contained in the paste. In general, the barrier rib must have a width of about 20 um and a height of about 5 um, to realize a general resolution (i.e. about 100 ppi) of mobile displays.

The application of the porous nanoelectrode paste is carried out through a general technique well-known in the art, e.g., paste printing, solution spin coating or electrophoretic deposition.

Figure 5:
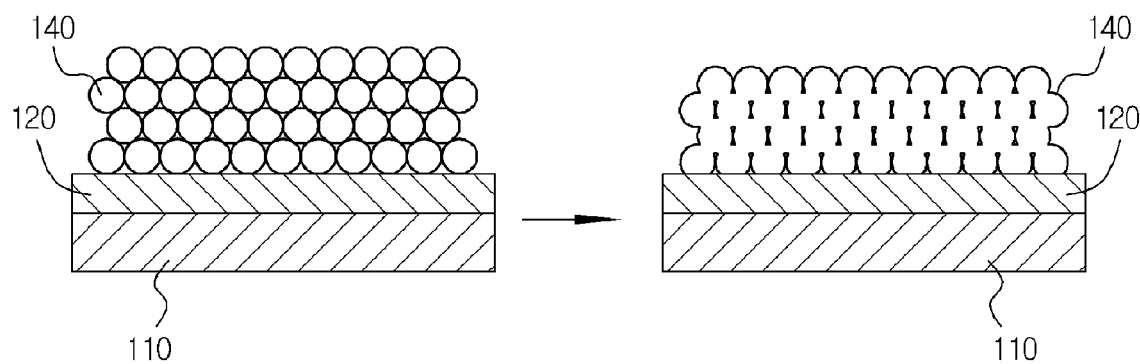

After the application of the electrode-forming paste, the barrier rib and the electrode-forming paste are sintered. Preferred is thermal sintering. This is the reason that thermal sintering induces the top of nanoparticles to be slightly melted, as shown in FIG. 5, thus maintaining the porous structure and improving both adhesion between adjacent particles and adhesion between particles and the electrode parallel thereto, to enhance electroconductivity and furthermore, elevate the overall efficiency of the electrochromic display.

The thermal sintering temperature depends on the type of the material. $TiO_2$ and antimony-tin oxide (ATO) that exhibit the highest performance of electrode materials are efficiently sintered at 450° C. to 500° C.

An electrochromic material is coated on the surface of the nanoelectrode particles using dip coating, spray coating or spin coating. Examples of the electrochromic material that can be used in the present invention include, but are not necessarily limited to polyaniline, polypyrrole, polythiophene, viologen and a derivative thereof.

Figure 6:
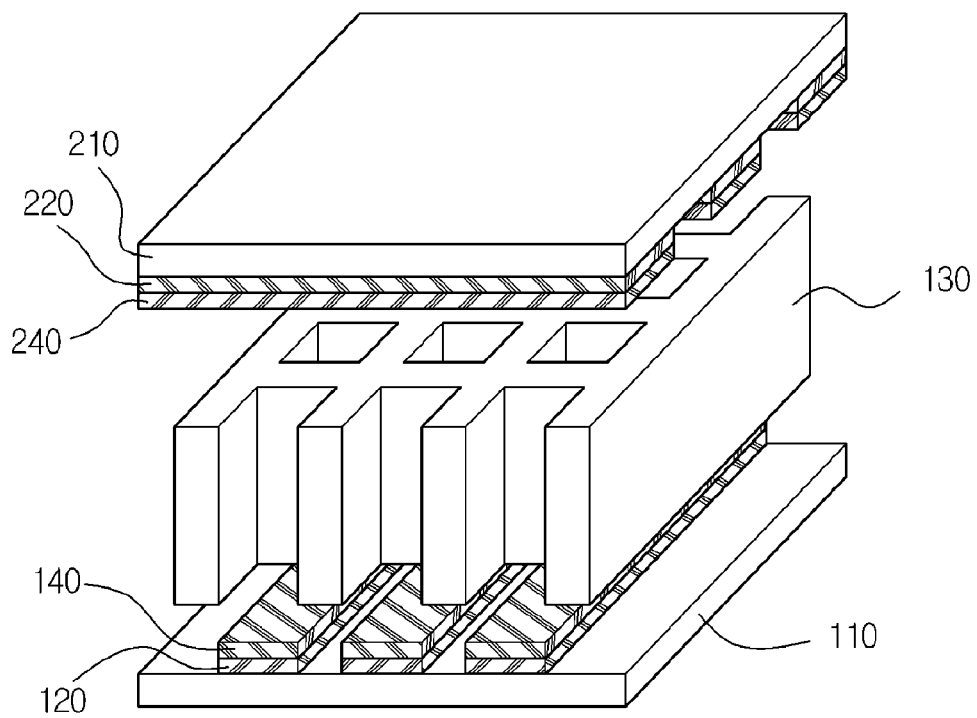
Figure 7:
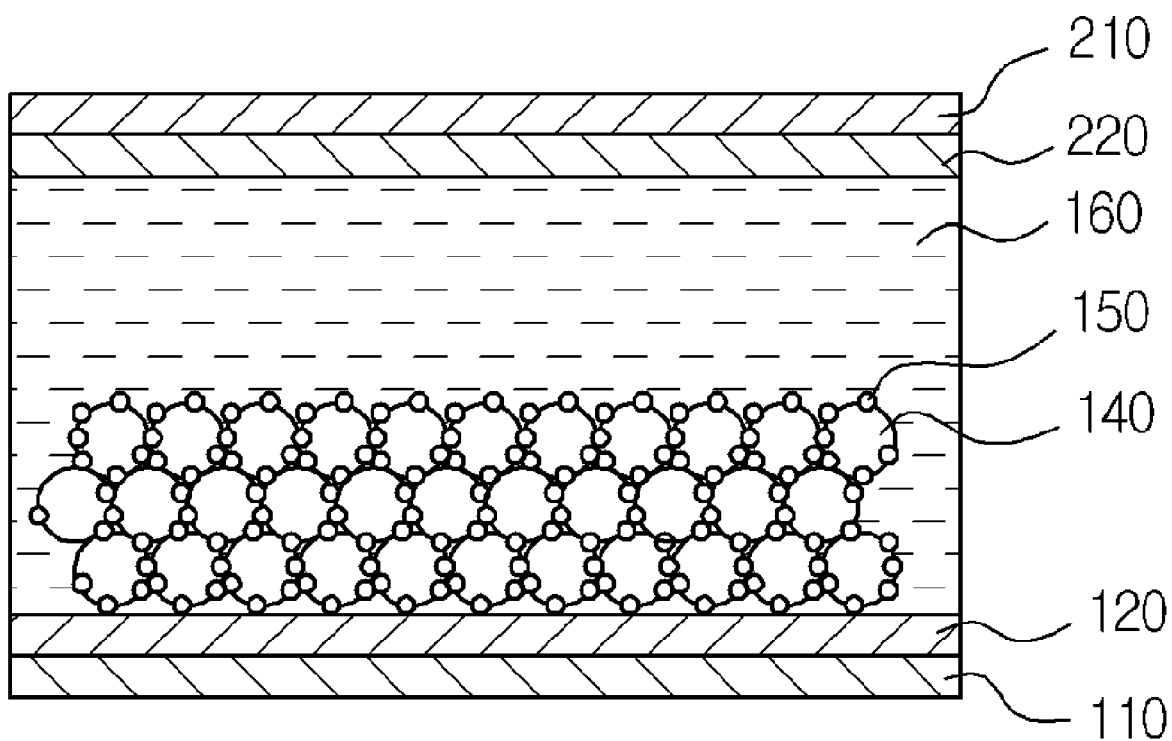

After the coating of the electrochromic material, according to a method well-known in the art, a counter electrode is formed, such that it faces the transparent electrode, and an electrolyte is then filled into the space between the counter electrode and the transparent electrode, thereby finally manufacturing an electrochromic display. FIG. 6 is a schematic view illustrating the structure of the electrochromic display having the barrier rib for separating pixels. FIG. 7 is a cross-sectional view schematically illustrating the electrochromic display shown in FIG. 6.

Referring to FIGS. 6 and 7, the electrochromic display according to example embodiments of the present invention includes: a first substrate 110 and a second electrode 210 arranged, such that they face each other; a first transparent electrode 120 and a second transparent electrode 220 arranged on the first substrate 110 and the second electrode 210, respectively; a barrier rib 130 arranged on the first transparent electrode 120; a first porous nanoelectrode portion 140 and a second porous nanoelectrode portion 240 arranged on the first transparent electrode 120 and the second transparent electrode 220, respectively; an electrochromic layer 150 coated over nanoparticle surfaces of the first porous nanoelectrode portion 140; and an electrolyte layer 160 arranged into the space between the transparent electrodes 120 and 220. The formation of the electrolyte layer may be carried out according to various methods, and one example thereof is given as follows. The transparent electrode and the counter electrode are adhered face-to-face with an adhesive agent. A fine hole is formed, such that it passes through the transparent electrode and the counter electrode. An electrolyte solution is injected through the fine hole into the space between the two electrodes. Then, the outlet of the hole is sealed with an adhesive agent.

The electrolyte that can be used for the electrochromic display of the present invention is a liquid, molten salt or solid type and comprises at least one electrochemically inert salt, for example, a solution of a lithium salt in an appropriate solvent. The lithium salt is selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are natural numbers), LiCl, LiI, and mixtures thereof. The solvent is selected from propylene carbonate, ethylene carbonate, diethyl carbonate, ethyl methyl carbonate, methyl propyl carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethyl carbonate, methyl ethyl carbonate, diethyl carbonate, methyl propyl carbonate, methyl isopropyl carbonate, ethyl propyl carbonate, dipropyl carbonate, dibutyl carbonate, diethylene glycol, dimethyl ether, or a mixture thereof.

Any electrolyte may be used without limitation so long as it exhibits a hole conductivity. The use of a polymeric hole conductor as the electrolyte enables the manufacture of flexible film type electrochromic displays.

Hereinafter, example embodiments will be explained in more detail with reference to the following examples. However, these examples are given for the purpose of illustration only and are not intended to limit example embodiments.

EXAMPLES

Example 1

A photosensitive paste was prepared according to the following composition: 26% by weight of $SiO_2$ or $Al_2O_3$ as inorganic particles; 20% by weight of a mixture of methyl acrylate and isobutyl acrylate as a photosensitive monomer; 30% by weight of a mixture of methyl acrylate and isobutyl acrylate as a photosensitive polymer; 20% by weight of a benzophenol-based compound as a photopolymerization initiator and ultraviolet absorber; and 4% by weight of 2,4,6-trimethylphenol as an additive including a photopolymerization inhibitor and plasticizer.

After fluorine-doped tin oxide (FTO) was applied to a glass substrate using a sputter, a barrier rib was formed with the paste through a photolithographic process. Subsequently, a paste of $TiO_2$ particles having an average particle diameter of 9 nm was applied to the resulting structure by screen printing or doctor blading and dried at 70° C. for 30 minutes. The substrate, where a nanoelectrode is formed, was dipped in a 1 wt % aqueous viologen solution for about 2 hours, to allow an electrochromic material to be coated on the surface of the nanoparticles. Then, the substrate was dried at about 80° C. for about 30 minutes to complete the manufacture of the substrate. The width and height of the barrier rib were measured via measurement of critical dimension (CD) with an optical microscope and cross-sectional SEM analysis. The results are shown in TABLE 1.

Comparative Example 1

A photosensitive paste was prepared in the same composition as in Example 1, except that 40% by weight of $SiO_2$ or $Al_2O_3$ as inorganic particles, 8% by weight of the benzophenol-based compound, and 2% by weight of 2,4,6-trimethylphenol were used. An electrode of an electrochromic display was manufactured in which a barrier rib is formed with the photosensitive paste. The width and height of the barrier rib were measured by the same procedure as in Example 1. The results are shown in TABLE 1.

Comparative Example 2

A photosensitive paste was prepared in the same composition as in Example 1, except that 30% by weight of $SiO_2$ or $Al_2O_3$ as inorganic particles; 16% by weight of a mixture of methyl acrylate and isobutyl acrylate as a photosensitive monomer; and 30% by weight of a mixture of methyl acrylate and isobutyl acrylate as a photosensitive polymer were used. An electrode of an electrochromic display was manufactured in which a barrier rib is formed with the photosensitive paste. The width and height of the barrier rib were measured by the same procedure as in Example 1. The results are shown in TABLE 1.

TABLE 1

| | | | Material type | Comp. Ex. 1 | Comp. Ex. 2 | Ex. 1 |
|---|---|---|---|---|---|---|
| Composition ratio (wt %) | Inorganic ingredient | Inorganic particles | SiO$_2$, Al$_2$O$_3$ | 40 | 30 | 26 |
| | Organic ingredient | Photosensitive monomer | Methyl acrylate + isobutyl acrylate | 20 | 16 | 20 |
| | | Photosensitive polymer | Methyl acrylate + isobutyl acrylate | 30 | 30 | 30 |
| | | Photopolymerization initiator & ultraviolet absorber | Benzophenol-based compound | 8 | 20 | 20 |
| | | Additive including photopolymerization inhibitor & plasticizer | Additive comprising 2,4,6-trimethylphenol | 2 | 4 | 4 |
| Size of barrier rib (um) | | | Width | 80 | 20 | 15 |
| | | | Height | 100 | 20 | 10 |

As apparent from data shown in Table 1, the optimum composition of the photosensitive paste used to form an electrode for an electrochromic display is in the following: 26% by weight of SiO$_2$ or Al$_2$O$_3$ as inorganic particles; 20% by weight of a mixture of methyl acrylate and isobutyl acrylate as a photosensitive monomer; 30% by weight of a mixture of methyl acrylate and isobutyl acrylate as a photosensitive polymer; 20% by weight of a benzophenol-based compound as a photopolymerization initiator and ultraviolet absorber; and 4% by weight of 2,4,6-trimethylphenol as an additive including a photopolymerization inhibitor and plasticizer. In this case, a barrier rib whose width and height are 15 um and 10 um, respectively, is formed, thus enabling fabrication of electrochromic displays with improved precision of patterns.

As apparent from the fore-going, an electrode for an electrochromic display according to the present invention includes a barrier rib for separating an electrolyte, wherein the barrier rib is composed of a photosensitive paste that is sintered at a high temperature and is applicable to a photolithographic process. The electrode for an electrochromic display enables fabrication of an electrochromic display that is capable of preventing cross-talk between pixels and that has advantages of fast response speed, prolonged lifespan upon repeated use and improved electrochromism, when compared to the cases of metal oxide electrodes.

Example embodiments have been described in detail with reference to the foregoing preferred embodiments. However, example embodiments are not limited to the preferred embodiments. Those skilled in the art will appreciate that various modifications and variations are possible, without departing from the scope and spirit of the appended claims. Accordingly, such modifications and variations are intended to come within the scope of the claims.

What is claimed is:

1. A method for manufacturing an electrode of an electrochromic display comprising:
   forming a wiring electrode on a substrate;
   forming a barrier rib on the wiring electrode with the use of a photosensitive paste;
   injecting an electrode-forming paste containing nanoparticles into the barrier rib;
   sintering the barrier rib and the electrode-forming paste to form a nanoelectrode; and
   coating an electrochromic material on the nanoparticle surfaces of the nanoelectrode;
   wherein the photosensitive paste comprises: 20 to 30% by weight of SiO2 or Al2O3 as inorganic particles; 15 to 25% by weight of a mixture of methyl acrylate and isobutyl acrylate as a photosensitive monomer; 25 to 35% by weight of a mixture of methyl acrylate and isobutyl acrylate as a photosensitive polymer; 15 to 25% by weight of a benzophenol-based compound as a photopolymerization initiator and ultraviolet absorber; and 3 to 5% by weight of 2,4,6-trimethylphenol as an additive including a photopolymerization inhibitor and plasticizer.

2. The method according to claim 1, further comprising: sintering the barrier rib at a high temperature, after forming the barrier rib with the photosensitive paste.

3. The method according to claim 1, wherein the barrier rib is formed through a photolithographic process.

4. The method according to claim 1, wherein the photosensitive paste comprises inorganic particles and an organic ingredient containing a photosensitive compound.

5. The method according to claim 1, wherein the photosensitive paste comprises: 26% by weight of SiO2 or Al2O3 as inorganic particles; 20% by weight of a mixture of methyl acrylate and isobutyl acrylate as a photosensitive monomer; 30% by weight of a mixture of methyl acrylate and isobutyl acrylate as a photosensitive polymer; 20% by weight of a benzophenol-based compound as a photopolymerization initiator and ultraviolet absorber; and 4% by weight of 2,4,6-trimethylphenol as an additive including a photopolymerization inhibitor and plasticizer.

6. The method according to claim 1, wherein the glass transition temperature (Tc) and thermal softening temperature (Tg) of the photosensitive paste are in a range from 350 degrees Celsius to 600 degrees Celsius.

7. The method according to claim 1, wherein the photosensitive paste exhibits insulating property after sintering.

8. The method according to claim 1, wherein the paste containing nanoparticles is applied to the barrier rib by printing, solution spin coating or electrophoretic deposition.

9. The method according to claim 1, wherein the electrode has a porous structure.

10. The method according to claim 9, wherein the porous structure is formed by high-temperature sintering.

11. The method according to claim 1, wherein the electrochromic material is selected from the group consisting of polyaniline, polypyrrole, polythiophene, viologen and a derivative thereof.

12. The method according to claim 1, wherein the electrochromic material is coated on the nanoparticle surfaces by dip coating, spray coating or spin coating.

13. An electrochromic display comprising:
   a wiring electrode formed on a substrate;
   a barrier rib formed on the wiring electrode;

a nanoelectrode having nanoparticle surfaces formed on the wiring electrode; and an electrochromic material formed on the nanoparticle surfaces of the nanoelectrode;

wherein the electrochromic material is selected from the group consisting of polyaniline, polypyrrole, polythiophene, and derivatives thereof.

14. The electrochromic display of claim 13, wherein the barrier rib comprises a sintered photosensitive paste having an insulating property.

15. The electrochromic display of claim 13, wherein the wiring electrode has a porous structure.

* * * * *